(12) United States Patent
Candella et al.

(10) Patent No.: US 7,801,828 B2
(45) Date of Patent: Sep. 21, 2010

(54) METHOD AND SYSTEM FOR DETECTING IDENTITY THEFT IN NON-PERSONAL AND PERSONAL TRANSACTIONS

(76) Inventors: George J. Candella, 348A Heritage Hills, Somers, NY (US) 10589; Jeremy D. Cass, 1 Warren Road, Bushey Heath, Herts (GB) WO23 1HU; Keith Kelland, 5 Robins Court, 32 Crescent Rd, Wimborne, Dorset (GB) BH21 1BJ ( * ) Notice: Subject to any disclaimer, the term of this patent is extended or adjusted under 35 U.S.C. 154(b) by 1073 days.

(21) Appl. No.: 10/189,898

(22) Filed: Jul. 3, 2002

(65) Prior Publication Data
US 2005/0021476 A1 Jan. 27, 2005

Related U.S. Application Data (60) Provisional application No. 60/303,490, filed on Jul. 6, 2001, provisional application No. 60/384,061, filed on May 28, 2002.

(51) Int. Cl.
G06Q 20/00 (2006.01)
(52) U.S. Cl. ............................... 705/76; 705/40; 705/44; 705/64
(58) Field of Classification Search ................... 705/64; 726/4, 5, 6, 7, 8
See application file for complete search history.

(56) References Cited

U.S. PATENT DOCUMENTS

| | | | |
|---|---|---|---|
| 5,884,289 A | 3/1999 | Anderson et al. | |
| 6,029,150 A | 2/2000 | Kravitz | |
| 6,122,624 A | 9/2000 | Tetro et al. | |
| 6,163,771 A | 12/2000 | Walker et al. | |
| 6,263,447 B1 * | 7/2001 | French et al. | 726/5 |
| 6,542,583 B1 * | 4/2003 | Taylor | 379/88.02 |
| 6,871,287 B1 * | 3/2005 | Ellingson | 726/9 |
| 6,993,502 B1 * | 1/2006 | Gryglewicz et al. | 705/31 |
| 2002/0054082 A1 * | 5/2002 | Karpf | 345/738 |
| 2002/0083008 A1 * | 6/2002 | Smith et al. | 705/64 |
| 2002/0087460 A1 * | 7/2002 | Hornung | 705/38 |
| 2002/0174062 A1 * | 11/2002 | Sines et al. | 705/39 |

OTHER PUBLICATIONS

"Fighting Back when Some Steals Your Name", Lee, Jennifer; The New York Times; Apr. 8, 2001, p. 3.8.*
"eHNC and Equifax Announce Alliance to Fight Internet Fraud, Increase E-Commerce Trust and Security, and Help Online Merchants Expand Their Markets", Business Editor and High-Tech Writers, Business Wire, Jun. 21, 2000, p. 1.*

* cited by examiner

Primary Examiner—M. Thein
(74) Attorney, Agent, or Firm—Rudoler @ DeRosa LLC (57) ABSTRACT

A method and system of detecting identity theft is disclosed. The method and system includes receiving identity data, the identity data including at least an address. Then, the address is compared to an external address database to determine whether the address is potentially fraudulent. The address is checked against a known fraud address table database to determine whether the address is fraudulent. The address may also be checked against a known good address table database to determine whether the address is potentially fraudulent. At least one database is queried for available incidental data associated with the address. And, a user is asked a question based upon the incidental data retrieved from the database, whereby the identity of the user is verified.

15 Claims, 7 Drawing Sheets

METHOD AND SYSTEM FOR DETECTING IDENTITY THEFT IN NON-PERSONAL AND PERSONAL TRANSACTIONS

CROSS REFERENCE TO RELATED APPLICATIONS

This application claims the benefit or prior filed U.S. Provisional Patent Application Nos. 60/384,061 entitled "SYSTEM AND METHOD FOR DETECTING FRAUD," filed May 28, 2002, and 60/303,490 entitled "SYSTEM AND METHOD FOR DETECTING FRAUD," filed Jul. 6, 2001, the contents of which are hereby incorporated by reference.

FIELD OF THE INVENTION

The present invention relates to a method and system for detecting identity theft in non-personal and personal transactions and reducing the risk of loss and threats to safety associated therewith.

BACKGROUND OF THE INVENTION

Security, for either physical and financial matters, has always been a difficult balance in a free society. While security requires information, freedom requires the ability to keep personal information private. In the past, Americans chose privacy above security. The tragedy perpetrated on Sep. 11, 2001, has forever changed America's view of security matters. This approach to Identity Theft Prevention is meant to achieve both goals, preserving privacy while creating a more secure environment for both "in person" transactions and actions and "remote commerce" transactions to privacy standards acceptable prior to September 11. In the past, the two questions asked at airports seemed an unnecessary delay to us all, now they take on the appearance of an inadequate attempt to provide a safe environment for the air traveler. Of the 19 terrorists directly involved in the attacks on the Pentagon and the World Trade Center, 14 were known to have used identity theft to board, and seven had their tickets bought on one credit card rumored to have been the result of an identity theft. Use of a reasonably comprehensive identity checking system at the ticket counter would have likely stopped those terrorists from boarding. Since they would have been unable to answer questions about their stolen addresses, they would have been subject to additional security measures. El Al, the Israeli airline, has been using similar approaches through human intervention for many years with great success. While this does not eliminate the need for other security measures, it does help assure that the person boarding a flight is who he/she claims to be. It also limits the need for closer investigation of each of the approximately 700,000 passengers on flights daily.

Fraud and identity theft are also prevalent in other fields of commerce. Today, electronic commerce encompasses a broad range of order and delivery channels such as the Internet, telephone, catalogue, and fax, to name the most visible. In addition to being homogeneous due to their electronic order, entry, and delivery means, these channels share a characteristic of non-personal payment or payee-not-present. That is, the electronic merchants and direct marketeers must accept electronic payments without being able to personally verify the purchaser's identity. As a consequence, one of the most serious problems facing electronic commerce today is the risk of transaction fraud when the consumer and merchant do not meet face-to-face.

Fraud can be divided both into merchant fraud (where a merchant defrauds a consumer) and consumer fraud, whereby a transaction is conducted by a consumer using a fraudulent credit card account or by a consumer misrepresenting himself in a transaction. Consumer fraud costs electronic merchants and direct marketeers today between 5% and 7% of their sales.

Presently, there are a number of companies who are in the business of limiting credit card fraud. Each of these companies utilizes a method of exposing the fraudulent transaction by determining that it does not follow a predictable experience in the usage of a particular credit card (i.e., within a geographic location, from one of a group of vendors, for a particular type of merchandise or service, etc.). Using these existing methods, the merchant is typically only notified when there is a deviation from a predictable credit card pattern.

It is fundamental to understand that for non-personal transactions, such as on-line or direct marketing transactions, since there can be no signature confirmation, the merchant accepts all of the risk that the transaction is fraudulent in the event that the credit card holder denies the charge. A transaction can be voided simply by the denial of a cardholder, and the merchant will have funds deducted by the transaction processor (netted from future payments), and the merchant will incur a charge-back cost.

For example, for an electronic transaction processed over the Internet, merchants have to contract with a transaction processor. Transactions can either be processed via a direct interface with the merchant, whereby the merchant directly captures information on the customer, the card numbers, the "ship-to" address, etc. or via a "gateway" company which outsources key features of the transaction processing and data capture.

The electronic merchant receives an order from the person who gives a name, credit card number, and expiration date to the retailer in connection with a purchase. The purchaser directs that the merchandise be delivered to an address which is different than the credit card billing address. Using traditional methods, the merchant receives a credit card approval number from its gateway and ships the merchandise to the shipping address.

If, in fact, the credit card number has been stolen and the transaction is fraudulent, the true cardholder will likely reject the invoice when he is billed for it, claiming fraud. Since the credit card company had confirmed the validity of the card (which remains in the owner's possession), and because the transaction is "card not present," i.e., was not involved with a signature verification, the credit card company has no liability. Assuming the cardholder refuses to pay the credit card company, the credit company will issue a charge back against the retailer, which has no recourse. As a result, the merchant loses the value of the merchandise, the shipping charge, the original transaction costs, and the transaction cost on the charge back with its payment processor. Such losses could be significant if the rate of fraudulent activity for these non-personal transactions is high.

Thus, there exists a need for a system and method for detecting fraudulent transactions in non-personal commerce transactions and reducing the risk and loss associated therewith.

SUMMARY OF THE INVENTION

A method and system of detecting identity theft is disclosed. The method and system includes receiving identity data, the identity data including at least an address. Then, the address is compared to an external address database to determine whether the address is potentially fraudulent. The address is checked against a known fraud address table database to determine whether the address is fraudulent. The address may also be checked against a known good address table database to determine whether the address is potentially fraudulent. At least one database is queried for available incidental data associated with the address. And, a user is asked a question based upon the incidental data retrieved from the database, whereby the identity of the user is verified.

The method and system may also include the steps of determining whether the user has answered the question correctly within a preselected period of time.

The method and system may also include the steps of selecting a preselected number of correct responses to the question and a preselected number of incorrect responses to the question and presenting both the correct and incorrect questions to the user.

In one form of the invention, The method and system may also include the steps of tracking the amount of time it takes the user to answer the question.

One additional step of the method may determine whether the method involves a security check and transmitting data to a government watch list if it is a security check or determining whether the identity data is transmitted via a global computer network.

BRIEF DESCRIPTION OF THE DRAWINGS

For a more complete understanding of this invention, reference should now be made to the embodiment illustrated in greater detail in the accompanying drawing and described below. In the drawings.

DESCRIPTION OF THE PREFERRED EMBODIMENT

Figure 1:
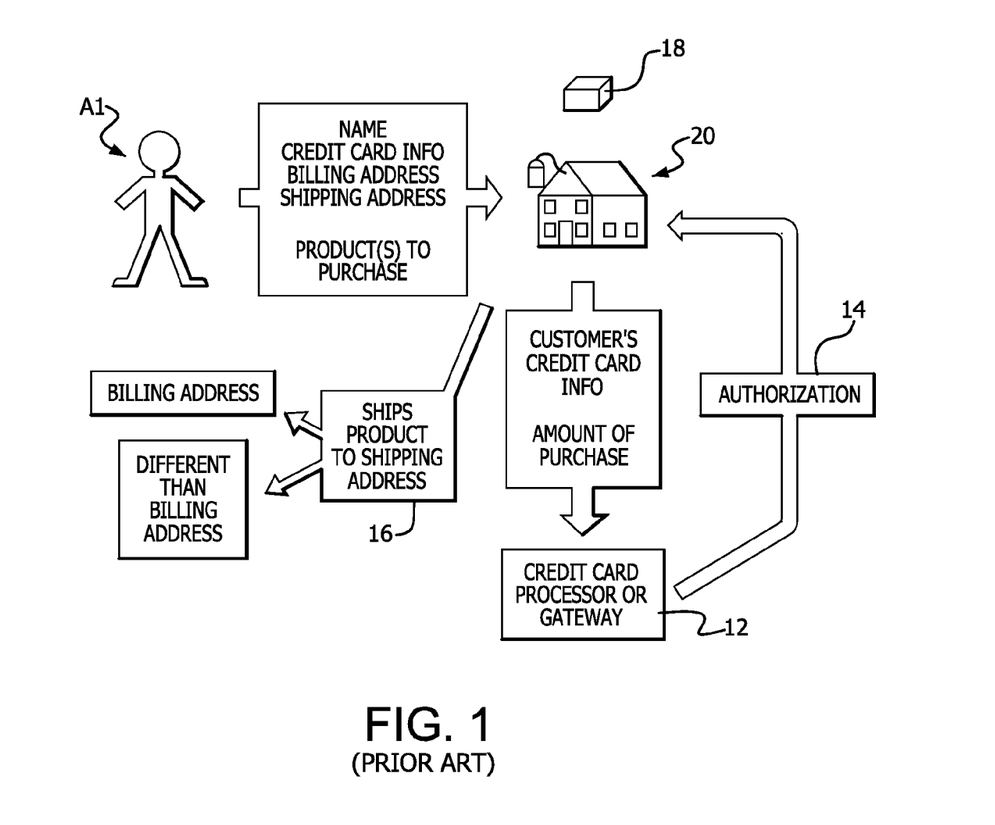
FIG. 1 is a schematic view of a typical prior art commercial transaction.

In FIG. 1 there is shown a typical transaction between a person (whom we will refer to as a "purchaser") A1 either purchasing a product 18, such as a ticket (for travel, entertainment, etc.) or service remotely, or seeking to gain entry to some type of location 20 (office building, government building, etc.), and the process that has been built to verify that the purchaser has met the criteria for purchase or entry. The purchaser A1 initiates the transaction either in-person or from a remote location, such as via the Internet or telephone. All of these methods of transacting share the same characteristic of being interactive, i.e. there is a simultaneous communication between the purchaser and verification or screening process.

In the case where the purchaser is purchasing a product, the purchaser A1 selects product(s) 18 to purchase from the merchant and transmits his personal information to the merchant. The merchant transmits the purchaser's payment information and the amount of the purchase to its payment processor or gateway 12. The payment processor or gateway 12 processes the payment information, such as credit card information, with the credit card issuer's bank and indicates whether the transaction has been authorized 14 by the issuing bank. Once the merchant receives the authorization 14 from the payment processor 12, it will typically shift the purchased products 18 to the shipping address given by the purchaser A1 shown in box 16. The shipping address may be the same as the credit card's billing address or may be different than the credit card's billing address.

There are as many different screening processes today as there are purchases to make, tickets to buy, and locations to enter. Most of these processes have historically focused on the purchaser having the appropriate credentials, e.g. proper ticket, proper ID badge, 'valid' drivers license. Few such screening processes have sought to verify the actual identity of the purchaser seeking entry, i.e., that they are who they claim to be. Events of the past few years, including the proliferation of identity theft, purchaser-not-present fraud, and terrorism have changed all of this thus, there exists the need by most entry or purchase screening processes today for a method for determining if a purchaser truly is who they claim to be, i.e., confirming the purchaser's true identity, as a first and essential security step in any entry or purchase process. The present invention fulfills this need and describes such confirmation process and system.

Figure 2A:
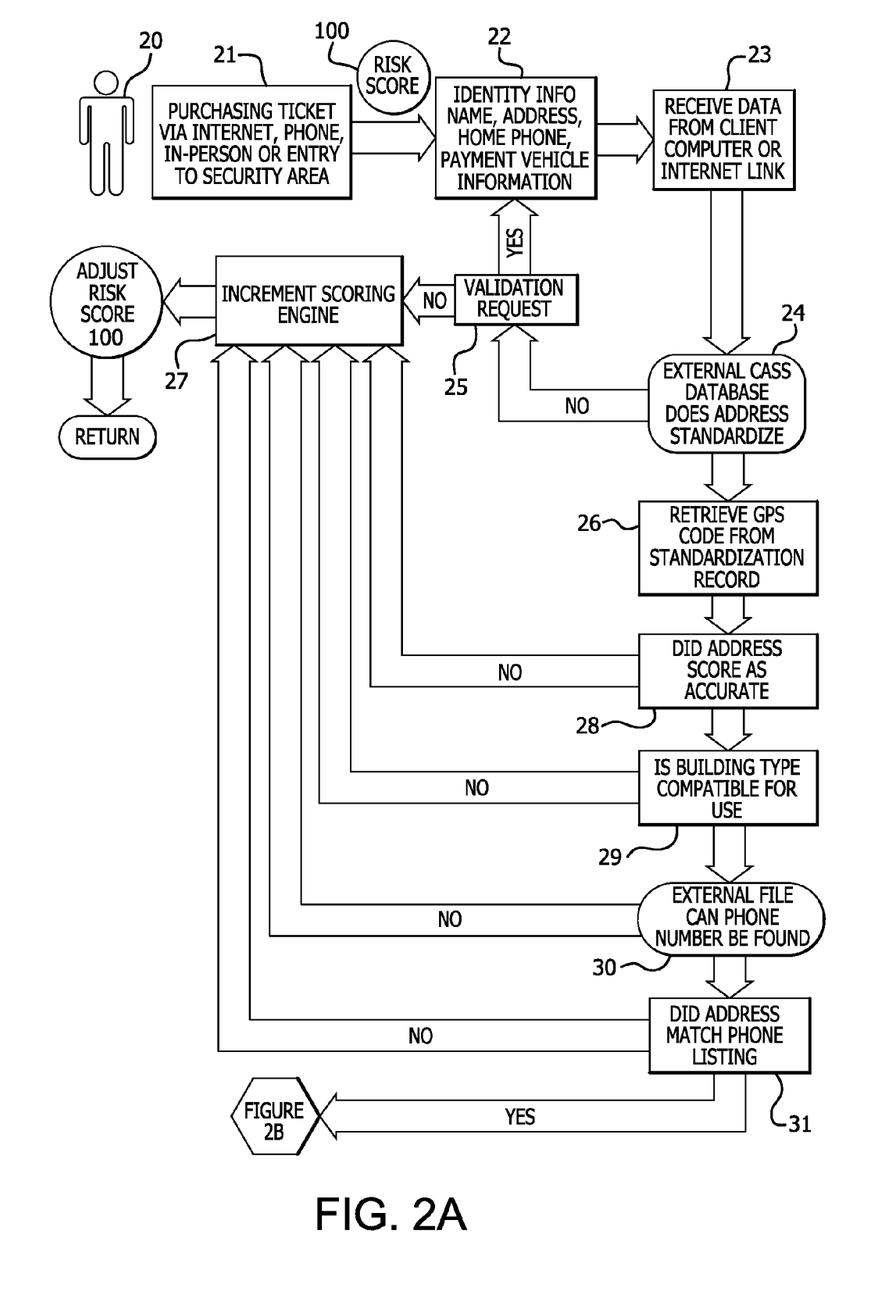
FIG. 2A is a schematic view of a first portion of the method and system for detecting identity theft of the present invention.
Figure 2B:
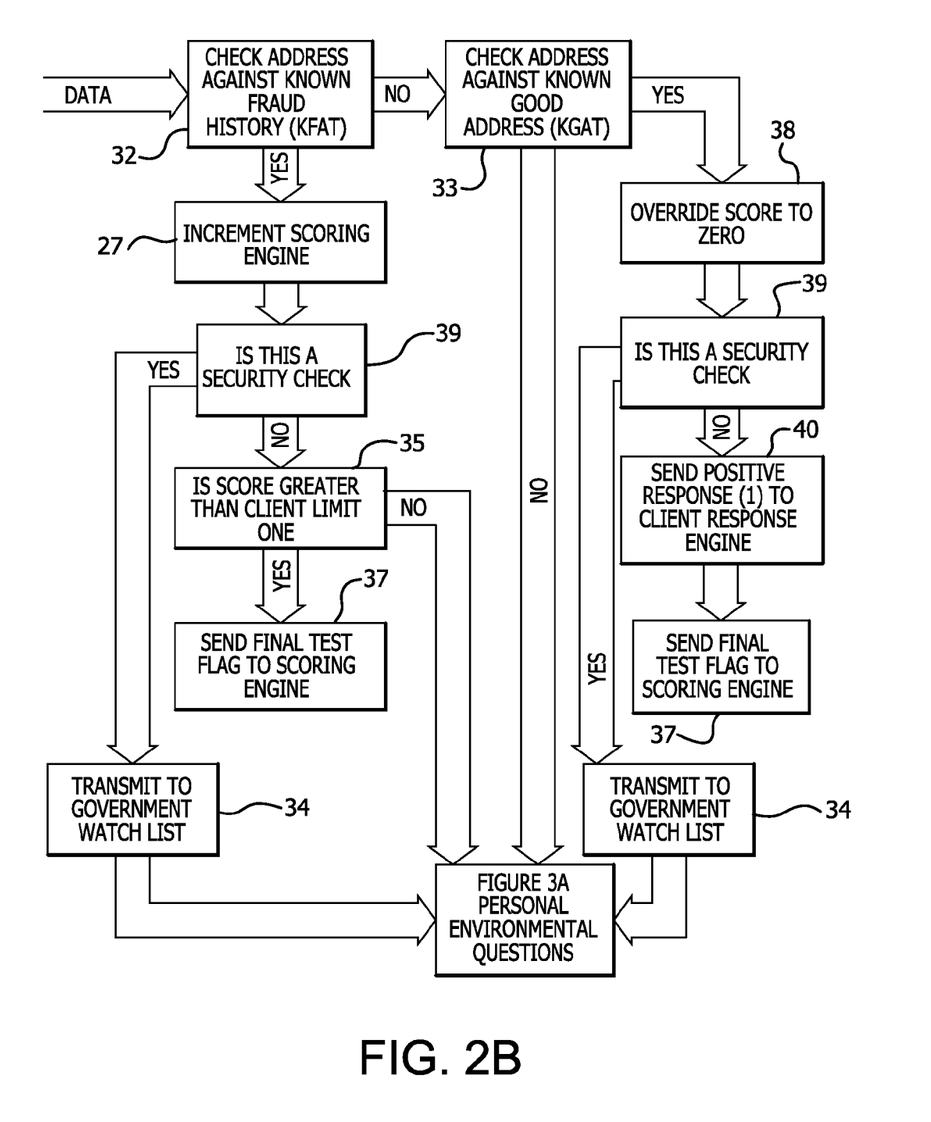
FIG. 2B is a schematic view of a second portion of the method and system of the present invention.

In FIGS. 2A and 2B there is shown a method and system for determining the risk that a person, such as a purchaser 20 seeking to buy a product or service, purchase a ticket or enter a location 21, is not who they claim to be.

A typical transaction begins with the purchaser 20 being asked (by a live clerk or an automated system) to provide identification information 22, such as their name, home address and home phone number, as essential data items, and various credit card or bank routing data, as optional data items. This identification data 22 may be entered by the purchaser himself or a clerk, into an Identity Detection System (IDS) 23.

The IDS 23 then proceeds through a series of detailed risk scoring steps 24, 26, 28, 29, 30, 31 to determine the probability that the purchaser is using another purchaser's identity in a fraudulent manner. This "probability" is calculated through an algorithm housed in a subsystem of the IDS 23 called the increment scoring engine 27 which operates as follows.

At the beginning of the identity detection process, a "risk score" 100 is initialized to a zero value. As the identity detection process proceeds, results from the data checking and question/answer steps are returned incrementally to the scoring engine 27.

Figure 4:
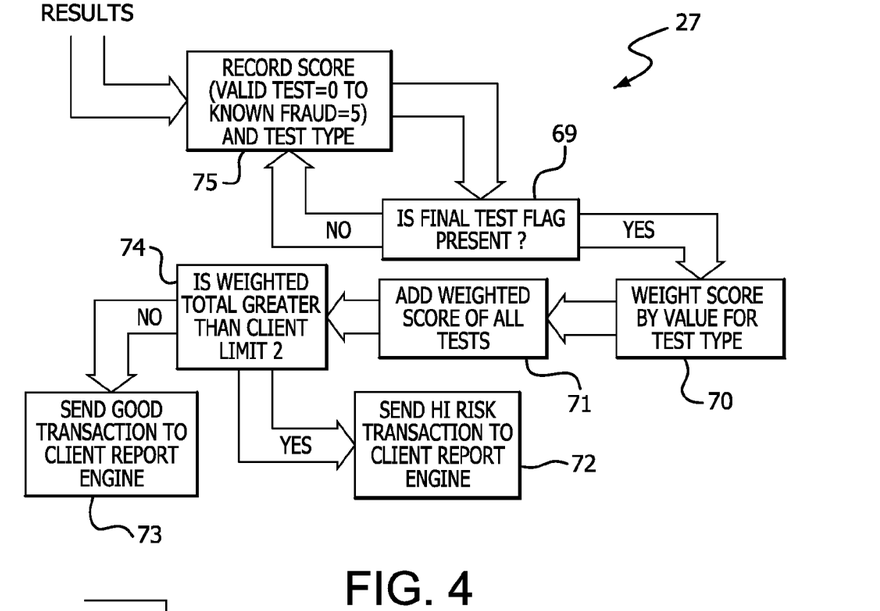
FIG. 4 is a schematic view of the scoring engine of the present invention.

The scoring engine 27 is shown in FIG. 4. If an incremental result 75 is returned positive (not associated with greater risk) the risk score retains its currently stored value (which could be zero). If, on the other hand, the incremental result 75 is returned negative (associated with greater risk then the risk score is increased (incremented) according to the weight of the data being checked as designed into the risk scoring algorithm.

Figure 5:
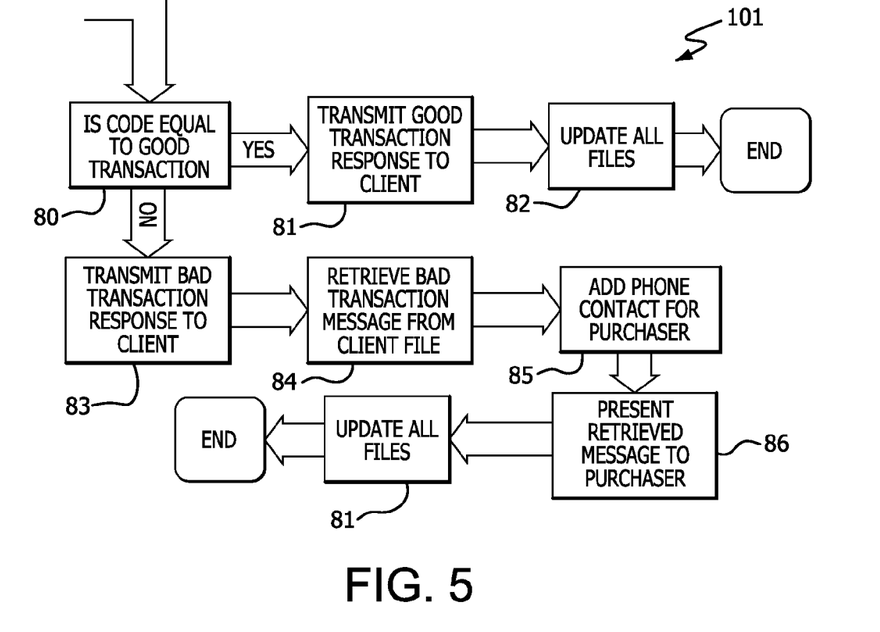
FIG. 5 is a schematic view of the client reporting module of the present invention.

This process of incremental scoring continues until the process is completed upon the detection of a "final test" flag 69 at which time the resulting composite risk score is returned to the client system 101 as shown in FIG. 5. The higher that score, the more likely the purchaser (trying to purchase a ticket or gain entry to a location) is someone other than who they claim to be. By allowing the client to chose the level acceptable risk he is prepared to tolerate 74, the level of risks can be customized. The sections below describe in greater detail each of the incremental scoring steps.

Risk Scoring: Address and Phone Number Checking Step

Referring back to FIGS. 2A and 2B, once the IDS has received the identity data 22 from the client system 23, either via a client computer or network link over the global computer network, the IDS begins the first step in the incremental scoring process, which is checking for the legitimacy of the purchasers home address. The address is first broken down into a usable format and passed against an external address standardization and scoring system 24: One such suitable external system is the United States Postal Service's Coding Accuracy Support System (CASS) which provides global positioning system (GPS) 26 points for geographic reference used in the 'questions' procedures which follow this portion of the system.

If the purchaser's home address cannot be standardized, then a message is sent back to the identity detection system which attempts to validate the request by asking for a corrected address 25 from the client system by returning to input step 22. If a validatable address cannot be provided by the purchaser when passed back through the validation requesting step 25 via the external address database 24, then the IDS communicates a negative result to the increment scoring engine 27 which appropriately increases the risk score 100 for the applicable purchaser, according to a risk scoring algorithm.

If the purchaser's home address is able to be standardized by the CASS, then the CASS evaluates the accuracy or "fit" of the address provided in step 28 This "fit" is a function of how many address sub-fields have to be modified to achieve standardization, e.g. changing "Street" to "Avenue." A measure of "fitness" is produced and communicated to the increment scoring engine, 27 which increments the risk score, according to the scoring algorithm within the increment scoring engine 27. A perfect "fit" score advances directly to the next step and this information is communicated to the scoring engine 27 which retains its present value.

Next, the system queries the CASS to determine the compatibility of a "building type" 29 field to the home address itself. This match is also provided by the CASS (and is related to the individual physical addresses). If there are no compatibility problems in the address-to-building type match, that information is communicated to the increment scoring engine 27, which retains its currently stored value. Any other combination of poor fit or poor match of address-to-building type will result in the increment scoring engine 27 increasing the risk score in accordance with the risk scoring algorithm. For example, if the home address indicates a building type of "Business Warehouse" for a home address provided by a purchaser, then that would be a non-compatible result, and the risk score within the increment scoring engine 27 would be increased.

The next step in the process is the comparison of the purchaser's home address with the home phone number. Similar to the address standardization step, this step is accomplished by consulting an external system or database 30 designed and built to match addresses and phone numbers. In comparison step 31, the external system indicates a perfect match of the home address given and the data returned from the database then that information is communicated to the increment scoring engine 27, which retains its currently stored value. If, on the other hand, during step 30, the external system communicates to the increment scoring engine that the phone number could not be found, then the increment scoring engine 27 will increase the risk score 100 in accordance with the risk scoring algorithm. Finally, if during the comparison step 31 the external system communicates that the home phone number has been found, but it matches a different name and address (than that provided by the purchaser), then, again, the increment scoring engine 27 will increase the risk score in accordance with the risk scoring algorithm.

Referring now to FIG. 2B, in the next step, the identity detection system receives the home address that was standardized in an earlier step, even if that address resulted in an increased risk score by the increment scoring engine 27. The system checks to determine whether a record associated with this particular address exists in the an internal database called the Known Fraud Addresses Table (KFAT) 32. The KFAT 32 comprises standardized addresses known to have been involved in the receipt of fraudulent shipments or transactions. If the address record does match an address in the KFAT 32, and the tests are not intended for government security purposes 39 then this match is communicated to the increment scoring engine 27, which increases the composite risk score 100 in accordance with the risk scoring algorithm. This risk score 100 is then compared to a first preselected client limit set point 35 and if it is greater than this limit, then the system sets the "final test flag" 37 indicating that the scoring-related questioning has been completed.

If the comparison of the KFAT database 32 is negative, the address is then passed against another internal database called the Known Good Addresses Table (KGAT) 33 which comprises a database of standardized known good addresses. If the address record matches a record in the KGAT, then this match information is communicated to the increment scoring engine 27, which overrides 38 its currently stored value to 0.

If the tests are not intended for government security purposes 39, then a positive or good response is transmitted to the client response engine 101 in step 40. Lastly, the system sets the "final test flag" 37 and passes this flag to the scoring engine 27 to indicate that the scoring-related questioning has been completed.

If an address record has come from a governmental or quasi-governmental (e.g. Amtrak) agency, then the address is also passed against the Federal Watch List Database 34 whether or not the address has already matched a record on the KFAT 32 or KGAT 33. If there is a match against the Watch List 34, then this match is communicated to the increment scoring engine 27, which increases the composite risk score 100 in accordance with the risk scoring algorithm; and in this case, a "high risk" message is immediately returned to the applicable client system. If there is no match against the Watch List 34, and the address either matched the KGAT 33 or did not match any other databases in the system, then the process proceeds to the personal environmental questions step, which is described below.

Risk Scoring: Interactive Questions and Answers Step

Figure 3A:
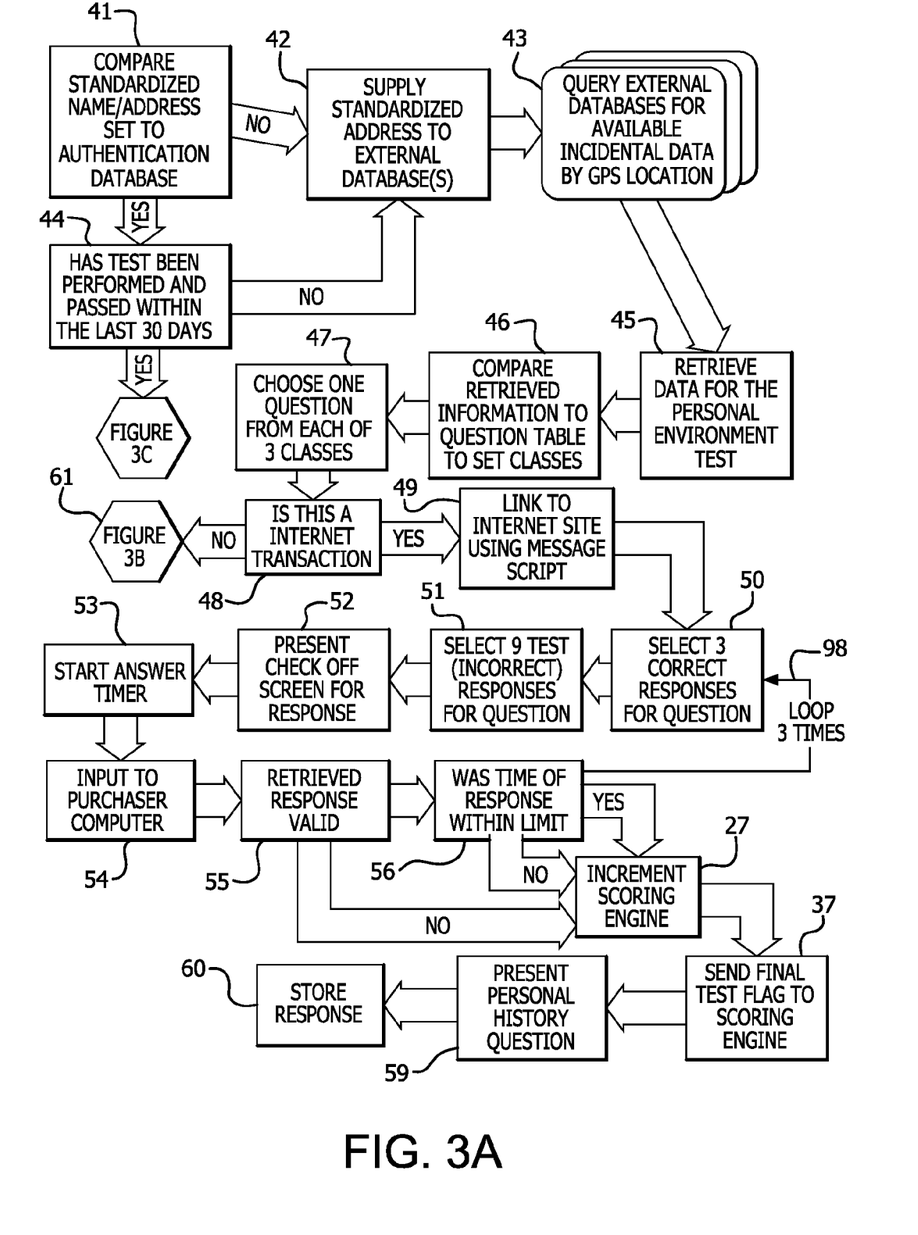
FIG. 3A is a schematic view of one portion of the environmental question portion of the present invention.

Referring now to FIG. 3A, after being transmitted from the government watch list step 34, receiving a negative score from the KGAT checking step 33, or if the composite risk score 100 is less than or equal to the client set point 35, the system moves on to the personal environmental questions step 99. The purpose of the Questions and Answers step 99 is to develop a small set of specific, but unpredictable questions to ask the purchaser whose identity is being checked related to his personal environment. By posing these questions in an interactive session, and by comparing timed responses against predetermined correct responses, the identity detection system can, with great certainty, conclude that the purchaser is indeed who he claims to be.

This "Q&A" step 99 begins with the name and address fields that were screened and standardized in the previous steps, being compared against an Authentication Database 41 which is an internal file. The Authentication Database 41 contains the names, addresses, phone numbers, and other related demographic data for all purchasers; or persons who have been screened through the Address and Phone Number Checking step 22 (detailed above). If the standardized name/address record being checked does not match any record within the Authentication Database 41, then the system causes that record to be transmitted to several external databases 42 so that the databases may be queried 43.

These external databases all aid the process of developing specific questions, and their corresponding responses, for the purchaser whose identity is being checked, with each database playing a unique role in developing specific correct responses 43.

For example, one question might be to ask the purchaser where the nearest auto dealership is in relation to his home. Using the GPS Code supplied during the address standardization process 24, the appropriate external database would determine (through GPS calculations) in real-time exactly what and where that nearest auto dealership is, and supply that information to the Q&A module 99 within the identity detection system. This process of seeking not-readily-available answers to questions is referred to as a "Personal Environment Test" step 45. Preferably, the questions presented are related to the proximity of the purchaser.

Once the response data is determined (calculated) and returned 45 to the identity detection system, that system compares the retrieved data to a Question Table 46 within the system. The Question Table 46, and its underlying logic, separates a list of 30+ available or potential questions into three separate classes (e.g. one class deals with geographic proximity questions like the auto dealership question above). When the response data is returned from the external databases, the responses are matched against the applicable questions. Then the system, using a random generation routine, or based upon the client's own criteria, selects up to three of these questions to ask the purchaser being identified, one question from each of the three classes 47.

Now the identity detection system determines how the purchaser is interacting with the system. Using messaging information supplied with the original name/address data, the system determines whether the purchaser is on the Internet or interacting with a client employee (via telephone session or in person).

If the purchaser has come to interface with the identity detection system via the Internet 48, then a link is established using a message script between the purchaser and the client's Q&A graphical user interface screens 49. The Q&A session now proceeds, with the questions being asked of the purchaser engaged in the Internet session. According to the internal logic within the Q&A module, the first question is presented to the purchaser, along with twelve possible responses, via a "checkoff screen" 52, i.e., a screen that gives the option to the purchaser (who should know the correct responses if he is who he claims to be) to check one response as "correct." The twelve responses are all shown on the checkoff screen; three which are known to be correct 50, and nine which are known to be incorrect 51. The nine incorrect answers are chosen randomly from a database of alternative answers in the pertinent category. The ratio of correct to incorrect answers can be varied to obtain a desired probability of successful answering on the part of the purchaser. The ratio 9:3 is the preferred ratio.

Additionally, at the instant at which the checkoff screen is presented to the purchaser, an internal timer is started 53 to measure the time it takes for a response to be provided (checked off). When the purchaser inputs an answer to the question, such as by checking off a response, the screen data is transmitted back to the identity detection Q&A module 54. The module first evaluates the response to the question. If the response is valid 55, then that information is communicated to the increment scoring engine 27, which retains its currently stored value. If, on the other hand, the response is invalid, then the increment scoring engine 27 will increase the risk score in accordance with the risk scoring algorithm. Next, the module evaluates how much time has elapsed before the response (valid or not) was provided by the purchaser.

If the time of response was within the system's preselected internal limit 56, then that information is communicated to the increment scoring engine 27, which retains its currently stored value. If, on the other hand, the response time exceeded the preselected limit, then the increment scoring engine 27 will increase the risk score in accordance with the risk scoring algorithm.

This process of Q&A and timing of responses enters a loop 98 and proceeds until up to a preselected number of questions, preferably three questions, have been asked and the appropriate number of responses provided by the purchaser, with the results of each response and the related response time being provided to the increment scoring engine 27.

When the response to the final question is provided by the purchaser, the identity detection system will set a "final test flag" 37 indicating that the scoring-related questioning has been completed. When this "final test flag" has been set, it triggers the asking of a "personal history question" 59 to the purchaser. A "personal history question" is of such a nature that it is unlikely to be found or even inferred from any external data source anywhere in the world. An example of such a question is; "What was the color of your first car?" The identity detection system stores several such questions; one of these questions is then asked of the purchaser as a last step in the identity detection process. When the "personal history question" has been asked and answered by the purchaser, the system stores the purchaser's response 60. That response will then be used as an identity validation tool when that purchaser next is presented to the system for identity authentication in the future. Now that the final test flag has been set, the increment scoring engine 27 can calculate a weighted score and transmit this score to the client reporting step 101 described below.

Going back to the beginning of this Q&A step 41, in which the standardized name and address record was compared against the Authentication Database, if the name/address record in question does match a record within the Authentication Database, then the system checks the applicable transaction date field to determine when the last time the same data was most recently checked. In comparison step 44, if that name/address record has not been matched within a preselected period, such as the last thirty calendar days, then the process proceeds as indicated above in connection with sub-step 42.

Figure 3B:
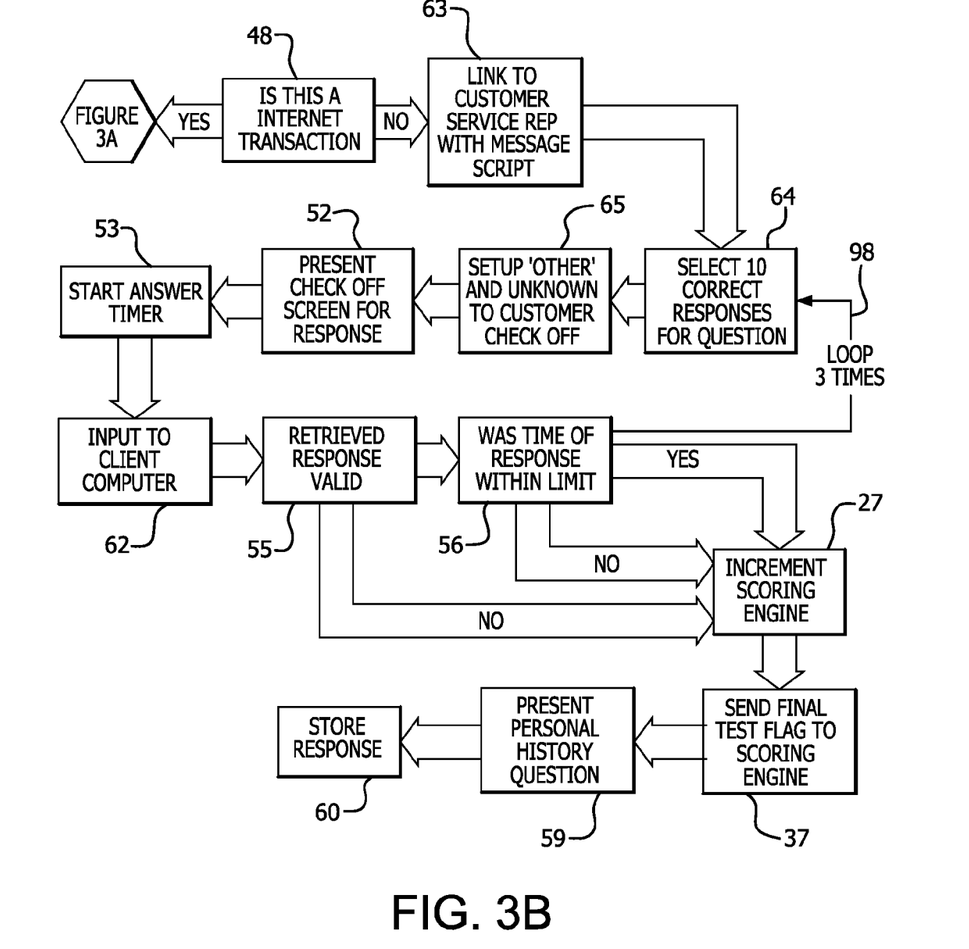
FIG. 3B is a schematic view of a second portion of the environmental question portion of the present invention.
Figure 3C:
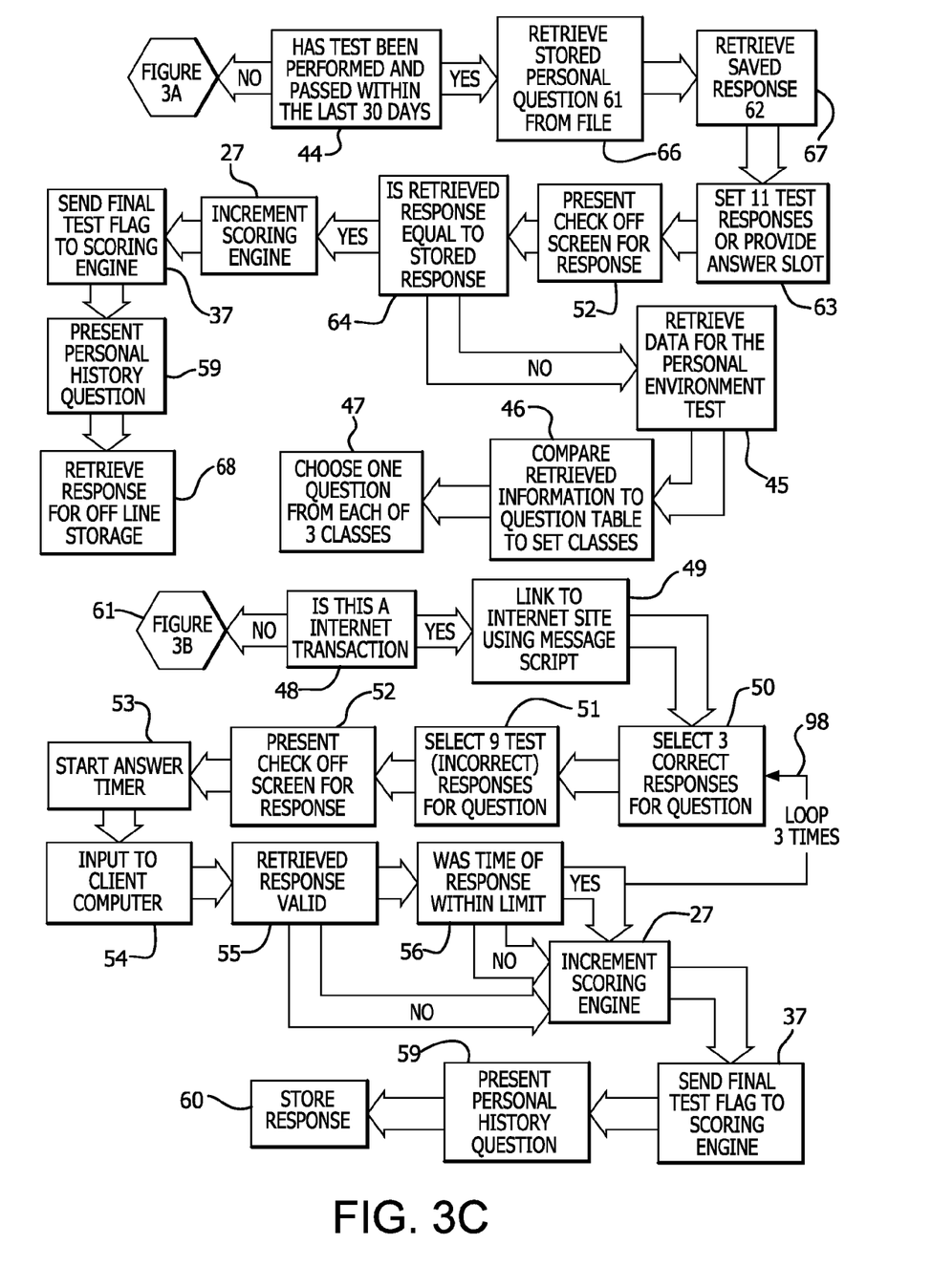
FIG. 3C is a schematic view of a third portion of the environmental question portion of the present invention.

Referring now to FIG. 3C, if, on the other hand, that name/address record has been matched within the preselected period, then the applicable (and previously stored) "personal history question" is retrieved from the Authentication Database 66, along with its corresponding response 67. Since it has been established that this purchaser has been matched against the Authentication Database within the last thirty days, there will be a "personal history question" 61 along with its appropriate response 62 already stored in the Authentication Database 66.

The Q&A module then generates a preselected number, preferably eleven, additional "non-valid" responses 63 to go along with the sole correct response, or alternatively provides an input box if such a "fill in the blank" type answer is more appropriate or desired. Either all of the twelve responses or the input box is presented to the Internet purchaser by way of a graphical user interface "checkoff screen" 52. When the purchaser has checked off the applicable response, the Q&A module compares 64 the response given against the valid response 61 stored in the Authentication Database 66. If the two match, then that information is communicated to the increment scoring engine 27, which retains its currently stored value. The system now sets the "final test flag" 37 indicating that the scoring-related questioning has been completed.

If, on the other hand, the two responses do not match, then the system increases the risk score 100 in accordance with the risk scoring algorithm and returns to the "supply standardized address to external databases" step 42 (FIG. 3A) and on to step 45 (FIG. 3C) and processes the transaction as if the purchaser was new to the Q&A segment.

As a final subset of this part of the system when the purchaser has answered the Q&A question successfully, when the aggregate risk score 100 is less than client limit one 35, a new personal environment question 59 is transmitted and presented to the purchaser, and the response is retrieved to be stored off line 68 for future rotation into the on line system, making it more difficult for a hacker to use stolen information.

In step 48, if it is determined that the transaction is not being conducted over the Internet, then the transaction is being conducted either in person or telephonically with the client. Referring now to FIG. 3B, a link is established to the customer service representative with a message script in step 68. A preselected number, preferably ten, of correct responses to the Q&A question is performed in step 64. Preferably, a large number of correct responses are provided for the benefit of the customer service representative so that he may have a relatively large amount of discretion in deciding whether the purchaser is able to answer the question accurately. In step 65, two additional options are generated. An "other" selection is generated in case the purchaser chooses an answer that is different than the ten correct answers generated. In addition, an "unknown to customer" option is generated for the event that a customer is unable to answer the question at all.

These twelve answers are preferably presented in a check off screen for response by the customer service representative in step 52. Thereafter, the procedure is identical to the procedure described in connection with FIG. 3A with the exception that input is directed to the client computer in step 62, rather than the purchaser's computer in step 54.

Referring now to FIG. 4, the scoring engine 27 will now be described in greater detail. Each time the scoring engine has been incremented in previous steps, a risk score is recorded and transmitted to the scoring engine 27. The scoring engine 27 tests 75 for the presence of the 'final test flag' 37 and when present it retrieves all the recorded test scores for the transaction. Each composite score, representing accuracy and time increments, is individually weighted 70 by an internal scoring algorithm, and the weighted score 71 is combined with the weighted score of all other tests for this transaction. That score is then compared to a stored maximum risk factor limit, "Second Client Limit" (CLT) 74, established by the client. If the weighted score is less than or equal to the "Second Client Limit" 74, then a good transaction (GT) flag or value 73 is sent to the client reporting module 101. If the weighted score exceeds the CLT 74, a high risk transaction (HR) 72 flag or value is sent to the client reporting module 101.

Referring now to FIG. 5, the Client Reporting Module 101 first evaluates the code 80 transmitted to it by the scoring engine 27. When a good transaction 81 transmits a "good transaction" flag 73 to the client, all the files are then updated with appropriate data from this transaction 82. The procedure is completed and the client can take appropriate action.

When the received code represents a 'high risk' transaction, a transaction likely to be fraudulent, the scoring engine 73 transmits a code representing a high risk transaction 72 to the client reporting module 101. The comparing step 80 identifies 83 that the high risk transaction 72 flag has been received and retrieves an appropriate transaction message from the client file 84, adds the client's chosen phone contact to the message 85, and presents a 'contact the client' message to the unauthenticated party 86. As a final step all files are updated with appropriate data 81. At this point, the procedure is complete and the client may take appropriate action upon notification.

Many of the components described in connection with the present invention have been disclosed and are described in greater detail in copending U.S. patent application Ser. No. 09/710,776 filed on Nov. 9, 2000 and entitled "Method and System for Detecting Fraud in Non-Personal Transactions" the specification of which is incorporated by reference herein.

While certain preferred embodiments and various modifications thereto have been described or suggested, other changes in these preferred embodiments will occur to those of ordinary skill in the art which do not depart from the broad inventive concepts of the present invention. Accordingly, reference should be made to the appended claims rather than the specific embodiment of the foregoing specification to ascertain the full scope of the present invention.

What is claimed is:

1. A method for detecting a presence of identity theft and reducing a likelihood of identity theft in a transaction, comprising the steps of:
    receiving and storing identity data of a customer on a computer readable storage medium for processing interactively and in real-time on a computer, the identity data comprising a customer address;
    parsing the customer address to postal standards with a computer processor and comparing the customer address against a Coding Accuracy Support System (CASS) to determine whether the customer address is a structurally viable and an existing address, retrieving a GPS code associated with the customer address from a GPS/address database, determining the names of retail, commercial, or government buildings and establishments near the GPS code which represent potential answers, and generating at least one question based on the potential answers in real time;
    presenting the question to the customer and obtaining an answer from the customer; and
    verifying the identity of the customer based on whether the customer address exists in the CASS and whether the customer's answer matches at least one of the potential answers, whereby detecting the presence of identity theft and reducing the likelihood of identity theft in the transaction.

2. The method for detecting identity theft in a transaction according to claim 1 wherein the identity data further comprises a customer phone number and wherein the processing step comprises checking the phone number to determine whether the phone number fits a geographic area of the customer's address and modifying the likelihood of identity theft based on the results.

3. The method for detecting identity theft in a transaction according to claim 2 wherein the processing step further comprises consulting a building type database to rate a building site associated with the customer address to determine whether a building or lot type is consistent with the customer address and modifying the likelihood of identity theft based on the results.

4. The method for detecting identity theft in a transaction according to claim 3 wherein the customer identity data further comprises a customer name and further comprising determining whether the method involves a security check and wherein if the method involves a security check the processing step further comprises consulting a Federal Watch List database to determine whether at least one of the customer name, address, or phone number exists in the Federal Watch List database and wherein the verification of the identity of the customer is further based on whether the at least one of the customer name, address, or phone number exists in the Federal Watch List database.

5. The method for detecting identity theft in a transaction according to claim 4 wherein the processing step further comprises checking one of the customer name, customer address, or customer phone number against an historical database to determine whether a prior history of fraud exists and modifying the likelihood of identity theft based on the results.

6. The method for detecting identity theft in a transaction according to claim 5 wherein the processing step further comprises consulting a transaction history database to determine whether one of the customer name, address, or phone number is associated with a pattern of overlapping use and payment methods and modifying the likelihood of identity theft based on the results.

7. The method for detecting identity theft in a transaction according to claim 1 wherein the processing step further comprises consulting a building type database to rate a building site associated with the customer address to determine whether a building or lot type is consistent with the customer address and modifying the likelihood of identity theft based on the results.

8. The method for detecting identity theft in a transaction according to claim 1 wherein the customer identity data further comprises a customer name and customer phone number and further comprising determining whether the method involves a security check and wherein if the method involves a security check, the processing step further comprises consulting a Federal Watch List database to determine whether at least one of the customer name, address, or phone number exists in the Federal Watch List database and wherein the verification of the identity of the customer is further based on whether the at least one of the customer name, address, or phone number exists in the Federal Watch List database.

9. The method for detecting identity theft in a transaction according to claim 1 wherein the customer identity data further comprises a customer name and customer phone number and wherein the processing step further comprises checking one of the customer name, customer address, or customer phone number against an historical database to determine whether a prior history of fraud exists and modifying the likelihood of identity theft based on the results.

10. The method for detecting identity theft in a transaction according to claim 1 wherein the customer identity data further comprises a customer name and customer phone number and wherein the processing step further comprises consulting a transaction history database to determine whether one of the customer name, address, or phone number is associated with a pattern of overlapping use and payment methods and modifying the likelihood of identity theft based on the results.

11. A system for detecting a presence of identity theft and reducing a likelihood of identity theft in a transaction, comprising:
a computer usable nontransitory medium having computer readable program code embedded therein for causing to receive and store identity data of a customer on a computer readable storage medium for processing interactively and in real-time on a computer, the identity data comprising a customer address;
computer readable program code for causing to parse the customer address to postal standards with a computer processor and comparing the customer address against a Coding Accuracy Support System (CASS) to determine whether the customer address is a structurally viable and an existing address, retrieving a GPS code associated with the customer address from a GPS/address database, determining the names of retail, commercial, or government buildings and establishments near the GPS code which represent potential answers, and generating at least one question based on the potential answers in real time;
whereby an operator presents the question to the customer, obtains an answer from the customer, and verifies the identity of the customer based on whether the customer address exists in the CASS and whether the customer's answer matches at least one of the potential answers in order to detect the presence of identity theft and reduce the likelihood of identity theft in the transaction.

12. The system for detecting identity theft in a transaction according to claim 11 wherein the identity data further comprises a customer phone number and wherein the computer usable medium further comprises computer readable program code for checking the phone number to determine whether the phone number fits a geographic area of the customer's address and modifying the likelihood of identity theft based on the results.

13. The system for detecting identity theft in a transaction according to claim 12 wherein the computer usable medium further comprises computer readable program code for consulting a building type database to rate a building site associated with the 'customer address to determine whether a building or lot type is consistent with the customer address and modifying the likelihood of identity theft based on the results.

14. The system for detecting identity theft in a transaction according to claim 13 wherein the computer usable medium further comprises computer readable program code for checking one of a customer name, customer address, or customer phone number against an historical database to determine whether a prior history of fraud exists and modifying the likelihood of identity theft based on the results.

15. The system for detecting identity theft in a transaction according to claim 14 wherein the computer usable medium further comprises computer readable program code for consulting a transaction history database to determine whether one of the customer name, address, or phone number is associated with a pattern of overlapping use and payment methods and modifying the likelihood of identity theft based on the results.

* * * * *